United States Patent Office 3,541,883
Patented Nov. 24, 1970

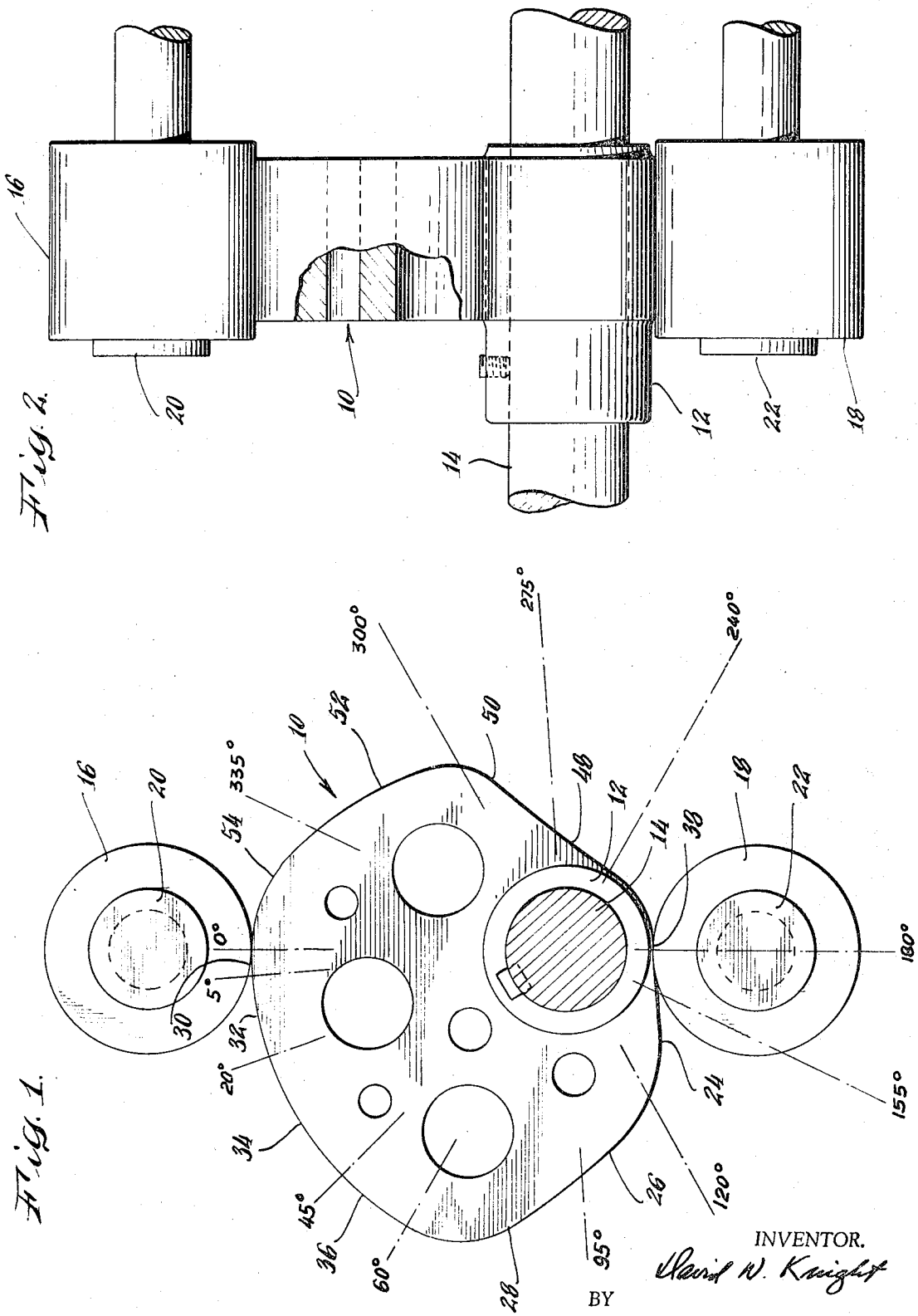

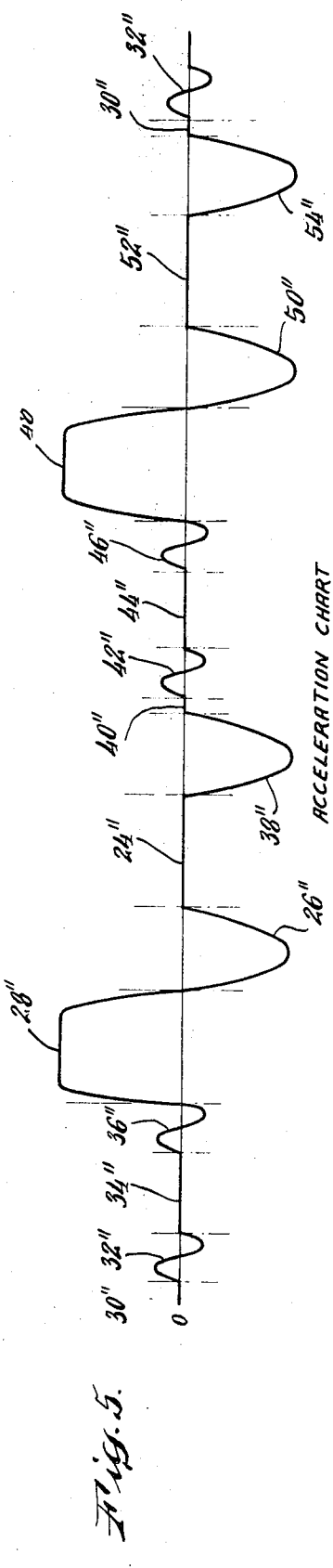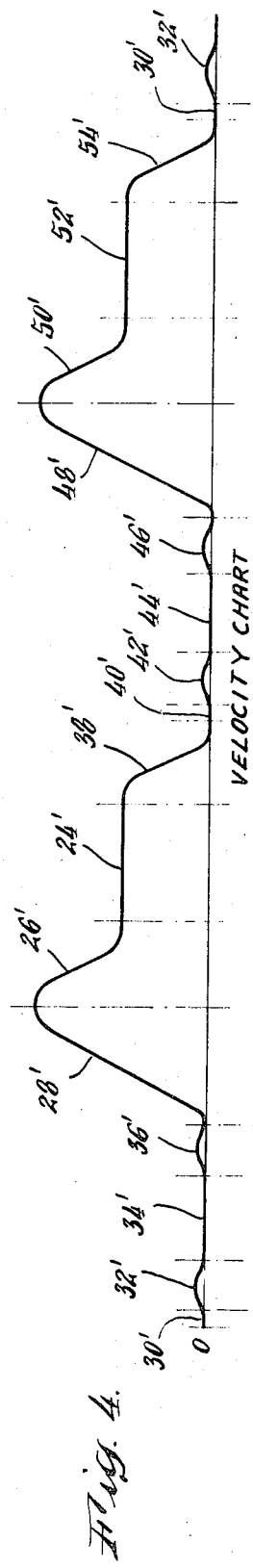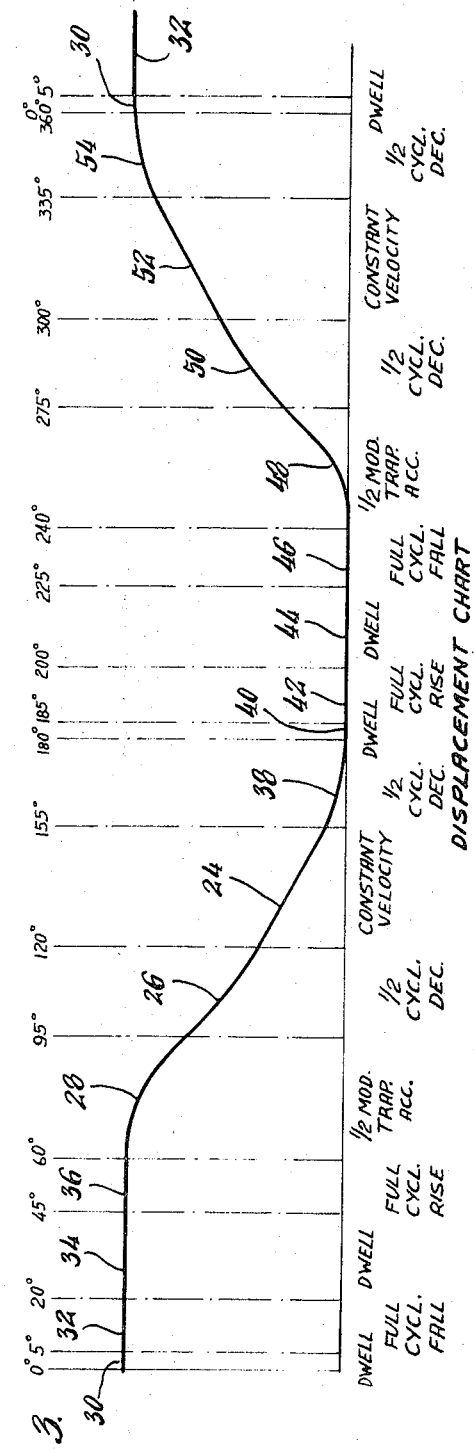

3,541,883
HIGH SPEED COMPOSITE CAM
David W. Knight, Stratford, Conn., assignor to The U.S. Baird Corporation, Stratford, Conn., a corporation of Connecticut
Filed Apr. 11, 1969, Ser. No. 815,419
Int. Cl. F16h 53/00
U.S. Cl. 74—567                    10 Claims

ABSTRACT OF THE DISCLOSURE

There is disclosed a cam for operating a machine tool, such as a drawing die. The cam includes high velocity portions permitting the tool to approach and withdraw from the workpiece at high speeds and an intermediate constant velocity portion for controlling the tool during its working cycle. The various portions of the cam surface are so formed that the start and end of each portion has a second derivative equal to zero. Therefore, the acceleration of each such point is also zero.

BACKGROUND OF THE INVENTION

In many automatic machine tool applications, the actual working time of a tool is relatively short in comparison with the overall operating time of the machine. This is particularly true, for example, in repetitive operations such as punching and drawing. In multiple transfer presses, for example, one of the most common operations is the drawing of deep cups in a series of reductions from a flat blank to a finished part. Less than half of the bottom end of the ram stroke is used to actually work the metal and draw the part. The velocity of this portion of the stroke is limited by the type of metal being worked and the shape of the part. However, in order to increase the production rate of such machines it would be desirable to increase the velocity of the tool during the nonworking portions of the stroke.

Presses of this nature are commonly driven by a pair of main drive cams which rotate at a constant radial velocity. Increasing the velocity of the tool, as set forth above, requires a suitable cam profile. The problem, however, is more complex than merely changing the profile of the cam. This is because the various portions of the cam profile, which represent different velocities, should meet at points of zero acceleration. Otherwise, when the profile curve changes, there are sudden accelerations and decelerations, resulting in noise and vibration.

Accordingly, it is the primary object of the present invention to provide a tool controlling cam wherein: the working portion of the tool stroke is at a constant velocity; the tool is at a higher velocity during non-working portions of the stroke; and changes in the velocity curve occur at points of zero acceleration.

SUMMARY OF THE INVENTION

In accordance with the present invention, there is provided a high speed tool controlling cam which has a camming surface including a first dwell portion, an increasing velocity high acceleration second portion adjoining the first portion, a decelerating third portion adjoining the second portion, a constant velocity fourth portion adjoining the third portion, a decelerating fifth portion adjoining the fourth portion, and a sixth portion interconnecting the fifth and first portions to return the cam rider to the first portion. At each juncture from one portion to the next, the acceleration is zero.

BRIEF DESCRIPTION OF THE DRAWINGS

The invention will be best understood by reference to the drawings wherein:

FIG. 1 is a front view of a cam incorporating this invention;
FIG. 2 is a right side view of the cam of FIG. 1;
FIG. 3 is a linear displacement chart of the cam of FIG. 1;
FIG. 4 is a chart of the first derivative, or velocity, of the curve of FIG. 3; and
FIG. 5 is a chart of the second derivative, or acceleration, of the curve of FIG. 3.

DESCRIPTION OF THE PREFERRED EMBODIMENT

FIGS. 1 and 2 illustrate a cam for use in a multiple transfer press. In an actual installation two such cams would be employed and mounted back to back on a single shaft. The cam 10 includes a central hub 12 and is fixedly mounted on the shaft 14. The illustrated cam is of constant diameter and turns between a pair of riders or rolls 16, 18 mounted on shafts 20, 22 which are separated by a fixed distance. In one embodiment, the rolls 16, 18 have diameters of 6.5 inches and their centers are separated by 19 inches. Shaft 14 rotates cam 10 at a constant velocity and rolls 16, 18 rotate continuously on the cam surface, alternately rising and falling to operate a drawing ram.

The cam 10 is shown in FIG. 1 in its full rise position and ready to begin a power stroke when rotated clockwise. Thus, the rolls 16, 18 are lifted and the tool which they control is at its maximum displacement from the workpiece. Also shown on FIG. 1 are various radial markings which identify specific portions of the cam surface.

In order to explain the construction of cam 10, there is illustrated in FIG. 3 a chart of the cam displacement in linear form. The radial markings of FIG. 1 are reproduced on this chart and those portions of the displacement curve corresponding to similar portions of the cam surface are given similar reference numerals. The velocity chart of FIG. 4 and the acceleration chart of FIG. 5 are vertically aligned with the displacement chart and correspond to the first and second derivatives, respectively, of the curve of FIG. 3.

It is one objective of this invention to provide a cam which will move the ram at a low constant velocity during the work stroke. Accordingly, the constant velocity portion 24 of the displacement curve is the first to be laid out. The value of this velocity depends upon the particular requirements of the job and is readily ascertainable by one skilled in the art. As the cam rotates at a constant speed, the corresponding portion of the displacement curve is linear, resulting in the constant velocity portion 24′ shown on the velocity chart of FIG. 4 and an acceleration of zero as shown on the corresponding portion 24″ of the acceleration chart of FIG. 5.

It is desired that the cam rolls approach the constant velocity portion of the cam at a high speed but enter it with zero acceleration. While a number of curves might be laid out on the displacement chart to accomplish this objective, the cycloid has particular advantages. These advantages reside in the fact that the formula of the cycloid is relatively simple and its second derivative is zero at its beginning, at its end, and at its inflection point. Accordingly, the deceleration portion 26 of the displacement curve comprises the ordinate of one-half a cycloid curve from its inflection point to its end, added to the ordinate of the extended constant velocity portion 24. As will be seen from FIG. 4, the inflection point of the cycloid is also its point of maximum velocity and, from FIG. 5, it will be apparent that the acceleration imparted at each end of the portion is zero.

To arrive at the high velocity end of the deceleration portion 26 there is provided an acceleration portion 28. This portion of the curve is a standard curve known as a modified trapezoid. It is a compound curve comprising two cycloid portions separated by a parabolic portion and, as will be seen from FIG. 5, it provides zero acceleration at each end with a high constant intermediate acceleration.

The portion of the curve from zero degrees to 5 degrees is a dwell portion 30. It is desirable to provide some relief during the dwell period to remove pressure and strain from the rolls and prevent heating. This is provided by incorporating into the displacement curve a relief fall 32. The actual amount of relief is quite small being, for example, in one actual embodiment, only .017 inch. Accordingly, the corresponding portions of the curves of FIGS. 4 and 5 are greatly exaggerated for purposes of illustration. This portion 32 of the curve is followed by a further dwell 34 and the rolls are led into the acceleration portion 28 by means of a full cycloidal rise portion 36 which is the equivalent of the relief fall 32.

The work stroke controlled by constant velocity portion 24 terminates with another one-half cycloid deceleration portion 38. From the deceleration portion 38, the rolls enter a dwell portion 40 and a full cycloidal relief portion 42 which serves the same function as the relief portion 32. This is followed by a further dwell portion 44 and a full cycloidal relief fall 46.

As this cam is a constant diameter cam, it is necessary for the rise portion to be the same as the fall portion. Accordingly, beginning at the 240 degree mark there is a one-half modified trapezoidal acceleration portion 48, one-half cycloidal deceleration portion 50, a constant velocity portion 52, and a one-half cycloidal deceleration portion 54 returning to the zero degree point.

It is believed that the many advantages of this invention will now be apparent to those skilled in the art. By means of this invention, there is provided a constant diameter cam for giving a tool a high velocity while advancing to or withdrawing from the work, while maintaining a low constant velocity working period. Vibration and noise are avoided by causing the various portions of the cam to meet at points of zero acceleration. It will also be understood that a number of variations and modifications may be made in this invention without departing from its spirit and scope. Accordingly, the foregoing description is to be construed as illustrative only, rather than limiting.

What is claimed is:

1. In a high speed composite tool-controlling cam and rider, the improvement which comprises: a camming surface defined by said cam including a first dwell portion; an increasing velocity, high acceleration second portion adjoining said first portion, the acceleration of said rider at each end of said second portion being zero; a decelerating third portion adjoining said second portion, the acceleration of said rider at each end of said third portion being zero; a constant velocity fourth portion adjoining said third portion; a decelerating fifth portion adjoining said fourth portion, the acceleration of said rider at each end of said fifth portion being zero; and a sixth portion interconnecting said fifth and first portions to return said rider to said first portion.

2. The improvement of claim 1 wherein said cam is of constant diameter and said sixth portion is a reversed duplicate of said first through fifth portions.

3. The improvement of claim 1 wherein said second portion is one half of a modified trapezoidal curve.

4. The improvement of claim 1 wherein said third portion is one half of a cycloidal curve.

5. The improvement of claim 1 wherein said fifth portion is one half of a cycloidal curve.

6. The improvement of claim 3 wherein said third portion is one half of a cycloidal curve.

7. The improvement of claim 6 wherein said fifth portion is one half of a cycloidal curve.

8. The improvement of claim 7 wherein said first portion is a high dwell portion.

9. The improvement of claim 8 wherein said fifth portion terminates at a low dwell portion.

10. The improvement of claim 9 wherein said cam is of constant diameter and said sixth portion is a reversed duplicate of said first through fifth portions.

References Cited

UNITED STATES PATENTS 3,033,052  5/1962  Mouchon _____ 74—567 XR
3,358,591  12/1967  Bradlee _____ 74—567 XR FRED C. MATTERN, Jr., Primary Examiner F. D. SHOEMAKER, Assistant Examiner